(12) United States Patent
Cousin et al.

(10) Patent No.: US 7,743,217 B2
(45) Date of Patent: Jun. 22, 2010

(54) CACHE CONSISTENCY IN A MULTIPROCESSOR SYSTEM WITH SHARED MEMORY

(75) Inventors: Jean-Philippe Cousin, Grenoble (FR); Jean-José Berenguer, Grenoble (FR); Gilles Pelissier, Seyssins (FR)

(73) Assignee: STMicroelectronics S.A., Montrouge (FR)

( * ) Notice: Subject to any disclaimer, the term of this patent is extended or adjusted under 35 U.S.C. 154(b) by 688 days.

(21) Appl. No.: 11/475,844

(22) Filed: Jun. 27, 2006

(65) Prior Publication Data

US 2007/0016730 A1    Jan. 18, 2007

(30) Foreign Application Priority Data

Jun. 29, 2005    (FR)    ................... 05 06657

(51) Int. Cl.
*G06F 12/00* (2006.01)
(52) U.S. Cl. ........................ 711/145; 711/144
(58) Field of Classification Search .................. None
See application file for complete search history.

(56) References Cited

U.S. PATENT DOCUMENTS 5,522,057 A * 5/1996 Lichy .................. 711/144
6,145,059 A   11/2000 Arimilli et al.
2003/0131201 A1  7/2003 Khare et al.
2005/0027945 A1  2/2005 Desai

OTHER PUBLICATIONS

Preliminary Search Report, FR 05 06657, dated Mar. 1, 2006.

* cited by examiner

*Primary Examiner*—Matt Kim
*Assistant Examiner*—Ryan Dare
(74) *Attorney, Agent, or Firm*—Gardere Wynne Sewell LLP

(57) ABSTRACT

A process to make the cache memory of a processor consistent includes the processor processing a request to write data to an address in its memory marked as being in the shared state. The address is transmitted to the other processors, data are written into the processor's cache memory and the address changes to the modified state. An appended memory associated with the processor memorizes the address, the data and an associated marker in a first state. The processor then receives the address with an indicator. If the indicator indicates that the processor must perform the operation and if the associated marker is in the first state, the data are kept in the modified state. If the indicator does not indicate that the processor must perform the operation and if the processor receives an order to mark the data to be in the invalid state, the marker changes to a second state.

2 Claims, 2 Drawing Sheets

CACHE CONSISTENCY IN A MULTIPROCESSOR SYSTEM WITH SHARED MEMORY

PRIORITY CLAIM

The present application claims priority from French Application for Patent No. 05 06657 filed Jun. 29, 2005, the disclosure of which is hereby incorporated by reference.

BACKGROUND OF THE INVENTION

1. Technical Field of the Invention

The present invention relates to the design of digital systems in general, and particularly to apparatuses with multiple processors sharing a memory.

2. Description of Related Art

A number of digital systems comprise several processors to provide improved performances, particularly to overcome frequency limits of a single processor, and particularly for systems on chip. Each processor in such a system can synchronize its operation with the other processors and can share data through read/write operations in memory locations shared by all processors. In order to provide access to data with short response times or with a wide pass-band, each processor has a cache memory containing a local copy of data at a shared memory location. Since all processors can contain duplicate copies of the same memory location in their cache memory, it is necessary to maintain consistency between these cache memories. This consistency is assured by hardware and is used to optimize data exchanges by reducing the synchronization cost. Thus, when a processor modifies data in a cache memory, the cache memories of the other processors are automatically updated to reflect this change precisely.

FIG. 1 illustrates a snooping method on a global bus connecting processor cache memories with shared memory through a bridge chip. The digital system 1 in FIG. 1 has processors 2 and 3 provided with processing units 21 and 31 respectively, and cache memories 22 and 32 respectively. The system 1 also has a bus 4 that will facilitate operations to make cache memories 22 and 32 consistent. Bus 4 couples processors 2 and 3 to bridge 5, bridge 5 itself being coupled to a shared memory 6 and to an input/output channel 7. The interface of each processor with the bus has 120 bits, 64 bits being reserved for data and 56 bits being reserved for an address and the operation code.

Bridge 5 comprises a memory controller and a logic circuit to perform snooping transactions on the bus 4. The processors 2 and 3 and their cache memories 22 and 32 manage memory snooping transactions on the bus 4. Processors 2 and 3 use snooping data to keep the content of their cache memory consistent with the cache memory of the other processors.

Snooping is typically done using the MESI protocol. As a reminder, states according to the MESI protocol are associated with data in the cache memory of a processor. These states have the following meanings:

State M for modified means that the cache memory of the processor is the sole holder of a modified and valid copy of the data: neither the cache memories of other processors nor the main shared memory have this modified copy of the data.

State E for exclusive means that the cache memory of the processor and the main shared memory are holders of a copy of the valid data, but that the cache memories of the other processors do not hold this copy.

State S for shared means that the data in the cache memory of the processor may be held by the cache memory of other processors and that these data are also memorized in the main shared memory.

State I for invalid means that data in the cache memory of the processor are not valid.

Such a system has disadvantages. Several accesses to the cache memory are sometimes necessary to write some data previously in the state S. These accesses induce a complex microprocessor structure and a relatively high current consumption, which is penalizing for implementation in the form of systems on chip.

A need accordingly exists to solve one or several of these disadvantages.

SUMMARY OF THE INVENTION

An embodiment of the invention applies to a process to make the cache memory of the processor consistent with a memory shared by other processors provided with cache memories according to a cache consistency management protocol with at least modified, shared and invalid states of data in the cache memory. The method comprises:
- the processor processes a request to write data to an address in its cache memory marked as being in the shared state;
- the processor transmits the address to the other processors, the processor writes data to the address in its cache memory and marks this address as being in the modified state, the processor writes the address and the data, and places an associated marker in a first state in an associated memory, and;
- the processor receives the address later with an indicator indicating if the processor must perform a memory operation on this address.

If the indicator indicates that the processor must perform a memory operation; if the marker associated with the data is in the first state, the data are kept in the modified state in the cache memory; otherwise, the processor transmits a request to write the data into the shared memory and marks the data as being in the invalid state in its cache memory.

If the indicator does not indicate that the processor must perform the memory operation and if the processor receives an order to mark data in the invalid state, the processor puts the marker into a second state.

According to one variant, if the indicator indicates that the processor must perform a memory operation and if the marker is in a first state, the address and the data are erased from the associated memory.

According to one variant, if the indicator does not indicate that the processor must perform the memory operation and if the processor receives an order to mark data in the invalid state, the processor transmits a request to write the data in the shared memory.

According to another variant, if the indicator indicates that the processor must perform a memory operation and if the marker is in the first state, the processor sends a request to put the address of the cache memories of the other processors into an invalid state.

The invention also relates to a digital processor comprising:
- a cache memory with a data memorization zone and a zone for memorization of the state of consistency of these data, including the modified, shared and invalid states;
- an associated memory with a data memorization zone, a data address memorization zone and a marker memorization zone;
- a memory operations management unit capable of:

processing a request to write data to an address in the cache memory marked as being in the shared consistency state;

transmitting the address to other processors using a snooping protocol, writing data to the address in the cache memory and marking this address as being in the modified consistency state, writing the address and the data in the associated memory and placing the marker in a first state;

receiving the address, an indicator indicating if the processor must perform a memory operation on this address, and an order to mark data in the invalid state;

keeping the data in the modified state in the cache memory if the indicator indicates that the processor must perform a memory operation and if the marker is in the first state;

transmitting a request to write the data in a shared memory and to mark these data as being in the invalid state in the cache memory if the indicator indicates that the processor must perform a memory operation and if the marker is in the second state;

putting the marker in the second state if the indicator does not indicate that the processor must perform the memory operation and if the processor has received an order to mark data as being in the invalid state.

The invention also relates to a system comprising several processors as described above, a memory shared by the processors and a snooping device capable of:

receiving addresses and associated memory operation codes emitted by processors according to a snooping protocol;

transmitting addresses and an associated memory operation code to processors, and transmit an indication to one of the processors notifying it that it should perform a memory operation;

transmitting an order to processors to mark data in the invalid state;

receiving requests to write data into shared memory and make data transfers between the cache memories of processors and the shared memory.

According to one variant, this system is integrated in the form of a system on chip.

In accordance with an embodiment, a MESI protocol state process comprises a modified state, an exclusive state, a shared state and an invalid state. The MESI protocol further includes an intermediate state between the shared state and the modified state, wherein the intermediate state is entered into when a first processor processes a request to write certain data to an address in its cache memory marked as being in the modified state. If the first processor subsequently receives a request to perform a memory operation on the certain data then the modified state is entered into in the first processor, and the invalid state is entered into for other processors. Alternatively, if the first processor subsequently receives an indication that the other processor is operating on the certain data then the invalid state is entered into in the first at processor.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
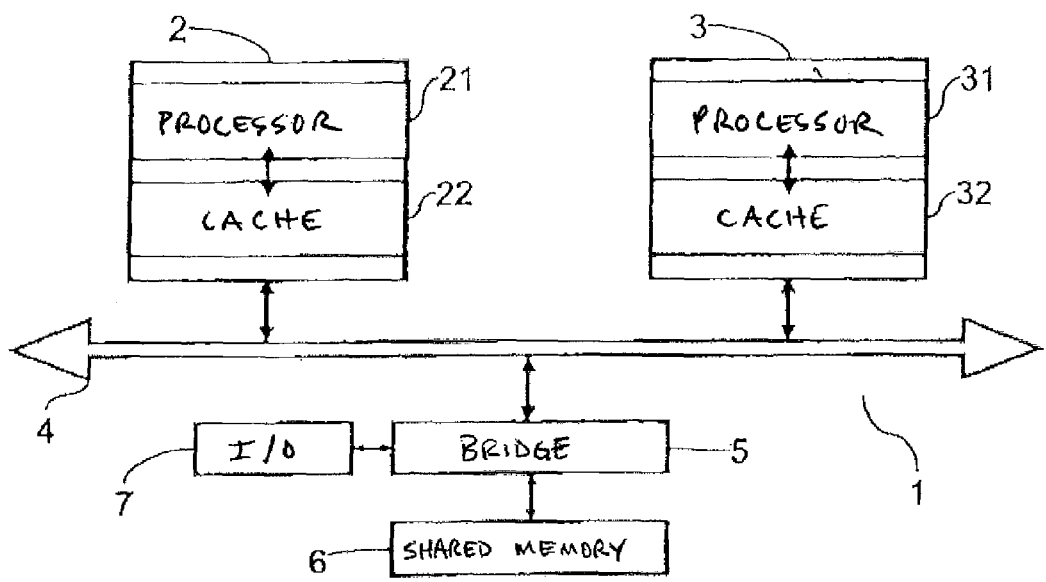
FIG. 1 illustrates a digital system according to prior art.
Figure 2:
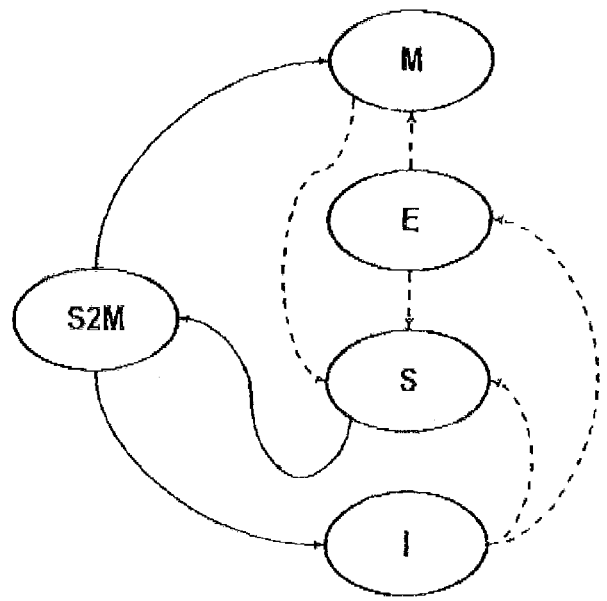
FIG. 2 diagrammatically illustrates state changes according to an improvement to the MESI protocol according to the invention.

FIG. 2 illustrates state changes induced by a modified MESI protocol according to the invention. The invention could also be applied with another protocol with shared, modified and invalid states of data in cache memory. The arrows in discontinuous (dashed) lines correspond to state changes normally used by the MESI protocol. The arrows in solid lines correspond to state changes introduced by the invention.

The invention uses a protocol for making caches consistent, in which an external operation required by a processor is signaled to all processors: the data address on which the memory operation should be performed and an indicator of the processor that will perform this operation are transmitted to all processors.

The invention proposes optimization of writing in state S by introducing a virtual intermediate state S2M between the shared state S and the modified state M. When the processor processes a request to write data to an address in its cache memory marked as being in the shared state S, these data change into the intermediate virtual state S2M. If the data remain in the S2M state and the processor receives an indicator specifying that it must execute its request and thus perform the memory operation on these data, these data change to the M state and the corresponding data in the other processors change to the invalid state. If the data remain in the S2M state and the processor receives an indicator specifying to it that another processor is executing a request concerning these data and requires invalidation, these data will change to state I.

During the change to the intermediate state S2M, the write operation is performed in the cache memory of the processor as if it were valid: data are written at the address and marked as being in state M. When changing to the intermediate state S2M, an associated memory memorizes the address and the data and marks that the processor has requested a memory operation on these data and this request is waiting for its execution.

The intermediate state S2M thus corresponds to the combination of data memorized temporarily in state M in the cache memory and these data memorized in the associated memory with a marker to a first state, that will be called the "memory operation waiting for execution" state. For the other processors, these data are still considered to be in state S in this processor, until the memory operation of the processor on these data has been done or invalidated.

As will be seen in detail later, the invention thus reduces the number of accesses to the cache memory of the processor while processing a request to write data in the shared state S. The write step is then transparent for the other processors.

During processing of a request to write to an address in its cache memory marked as being in the shared state S, the processor transmits the address to other processors, writes data to this address in its cache memory and marks this address as being in the modified state in its cache memory. The processor writes this address and the data in an associated memory and marks them as being in the "memory operation waiting for execution" state.

According to one snooping protocol, the processor then receives this address and an indicator from outside, indicating if it is to carry out a memory operation on this address. If so, the processor verifies the state of the marker in the associated memory. If the data are marked as being in the "memory operation waiting for execution" state, the data are kept in state M in the cache memory. The data and marking are then erased from the associated memory.

If the data are marked in a second state that will be called the "invalid memory operation" state in the associated memory, these data were also previously marked as being in state I in its cache memory and an operation to write data in the shared memory is requested. Therefore, the state of data is verified from the associated memory and not from the cache memory. An additional access to the cache memory is thus avoided.

If the indicator indicates that another processor is required to perform the memory operation on the address and if the processor receives an order to mark data in the invalid state, the processor marks the data in the "invalidated memory operation state in the associated memory and state I in its cache memory.

Figure 3:
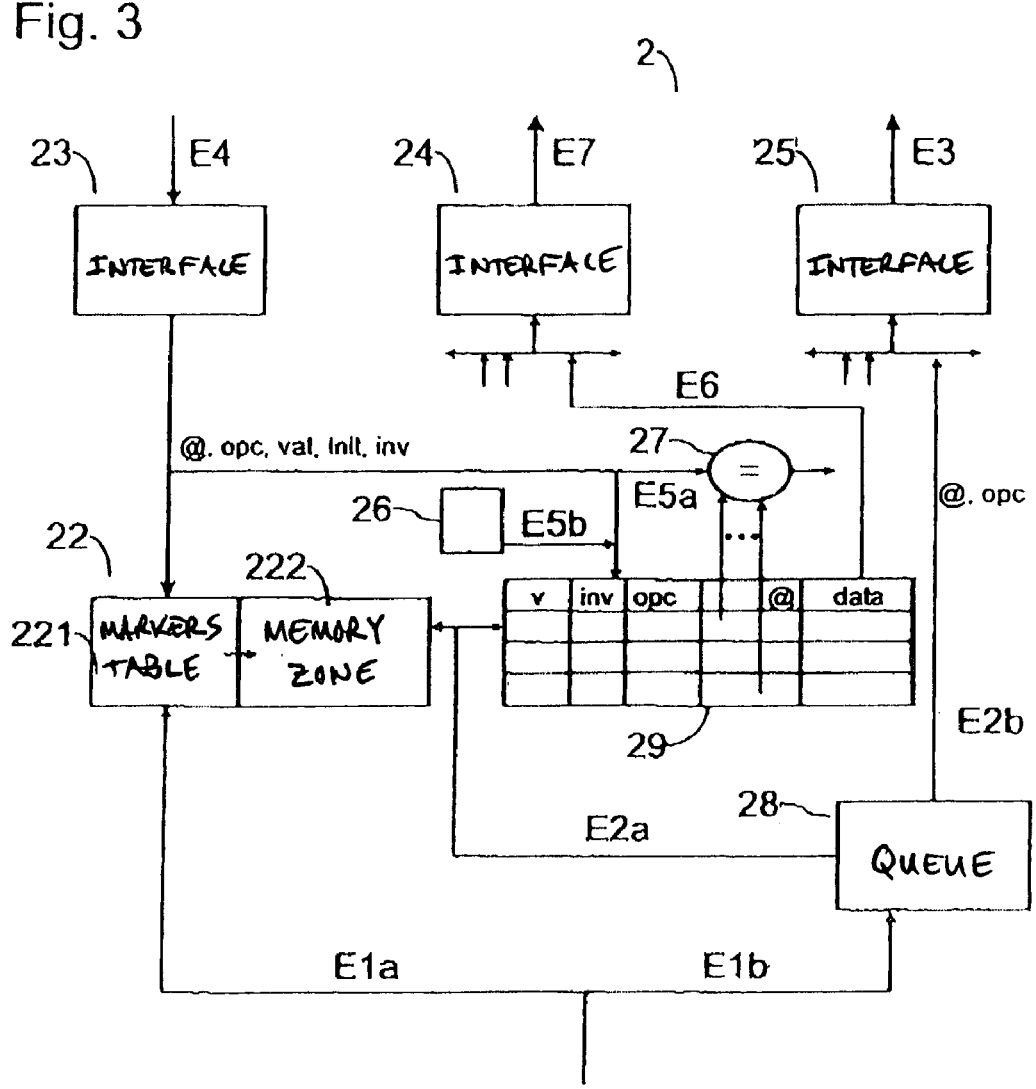
FIG. 3 illustrates an example transfers made in a processor to use the invention.

FIG. 3 illustrates different processing done by one embodiment of a processor 2 using the invention. Initially, the processor 2 processes a request to write data to an address in its cache memory. During step Ela, the processor determines if the data are present in the memorization zone 222 using the markers table 221. If the data are present in zone 222, the processor determines their state. At the same time, the processor puts the write request into a queue 28.

After determining that the data stored at the address indicated in the request are in the shared state, the processor 2 performs step E2a and E2b. During step E2a, the processor 2 extracts data and the address from the queue 28. The processor writes these data to this address in zone 222 of the cache memory 22 and marks them as being modified. During this step E2a, the processor 2 also writes data and the address and marks them as being in the "memory operation waiting for execution" state in a table 29 used as an associated memory. Table 29 presents an identification field "v", a marking field "inv", an operation code field "opc", an address field "1" and a data field "data". Marking in the "invalid memory operation" state corresponds to a value of the inv field equal to 1, marking in the "memory operation waiting for execution" state corresponds to a value equal to 0 in this field.

Processing of the write request is interrupted until the memory locations are released in table 29, so as to keep data in processor cache memories consistent if table 29 is full.

In step E2b, the processor 2 prepares transmission of the data address to the other processors according to a snooping protocol. The processor arbitrates this transmission with other transmissions related to other memory operations processed by the processor 2, if there are any. When the processor 2 has decided to make this transmission, it transmits the data address and the memory operation to be done to a FIFO of the interface 25. The processor 2 performs this transmission to the other processors through the interface 25 during step E3. A snooping device, not shown, can then receive the transmission from the processor 2 and make an arbitration with all transmissions provided by the other processors.

In step E4, the snooping device decides to take action following the request from processor 2. The snooping device then transmits the address of data on which a memory operation is to be performed to each processor, and notifies the processor 2 whether or not it is to perform the memory operation. This address and this indication are memorized in a buffer memory of an input interface 23.

If the processor 2 is to perform the memory operation, table 26 contains a reference to an entry in table 29, during step E5B. The memory operation concerned is then determined by reading table 29. The state of the field inv associated with this memory operation is then verified.

If the inv field associated with this address is equal to 0 ("memory operation waiting for execution" state), this means that no memory operation of another processor has invalidated the memory operation required on the data, between steps E3 and E4. The data associated with this address are then erased from table 29. Data and marking of their state are then kept unchanged in the cache memory 22. In parallel, the snooping device transmitted the address to other processors by requesting that the corresponding data should be put in state I.

If the inv field associated with this address is equal to 1 ("invalid memory operation" state), this means that another processor has performed a memory operation on the data between steps E3 and E4, and that this other processor has transmitted a data invalidation order to the processor 2. An external write memory operation is then performed during step E6. The corresponding data, address and operation code are transferred from table 29 to a FIFO of an output interface 24, then erased from table 29. During step E7, the data, address and operation code are transferred from the FIFO to the snooping device that manages memorization of these data in the shared memory. When the snooping device has executed the write data operation, it sends a message to the processor 2 to validate this execution.

If the processor 2 is not required to perform the memory operation on the data and if it receives an invalidation order in step E4, it performs step E5a. It is determined that the address associated with the memory operation is memorized in table 29 through circuit 27. The inv field associated with the data in this address is set to 1, which corresponds to the "invalidated memory operation" state.

Advantageously, it is possible for the first processor to support linked load and conditional store type instructions. The purpose of these instructions is that a sequence linking a read and write operations of a processor cannot be broken by an intermediate write of another processor on these data. The processor 2 is provided with a connection register and an address locking register memorizing the physical address and a locking bit.

Execution of a linked load instruction takes place as follows; the physical address and the locking bit are registered in the processor locking register. Regardless of the content of the locking register, execution of the linked load updates the address and sets the locking bit to 1 in the locking register. The locking bit cannot be set to 1 by direct access, in order to guarantee consistency of the cache.

A conditional store instruction is executed as follows: it is checked whether or not the locking bit is locked. If the locking bit is equal to 0, the bit associated with the connection register changes to 0. The address in the locking register could also possibly be verified.

When the processor receives the address and the indication that it is to perform the memory operation on this address, if the corresponding locking bit is equal to 0 and the marker of the associated memory is equal to 1, the write operation is cancelled and the cache line is invalidated.

The write operation is only performed if the corresponding locking bit is equal to 1. Obviously, if the data to be written are in the E or M state in the cache memory, the write operation can be performed directly in this cache memory, the cache consistency protocol guaranteeing that this write operation will not have any influence on these data memorized in state I in other processors, if any.

The locking bit is set equal to 0 in the following cases:
when the processor that executes a conditional store instruction sets the locking bit to 0 and updates the associated connection register;

when the processor writes a value of 0 in the locking bit;

when a cache line is taken out of the cache memory and corresponds to the address contained in the locking register;

another processor or an external device writes to the address memorized in the locking register.

For data in state S, the processor transmits the address of data to the snooping device during execution of linked instructions. The decision to do the write is made as a function of information received by the processor 2 in step E4.

The use of these types of instructions is transparent for the snooping device. A linked load is seen as a conventional load and a conditional store is seen as a conventional write. The snooping device can guarantee the link between these operations: if a read/write data request to the same address made by a processor is arbitrated after a linked load of another processor, this request is blocked in the snooping device until this linked load has terminated.

For example, this type of instruction can be used to make several increments of a variable by several processors. This type of instruction is then intended to prevent two processors from simultaneously reading the same variable, the increment to the variable by one processor then not being taken into account by the other processor.

A state may be associated with each line or with each data page in the cache memory. Management of data in the cache memory by page adds considerable flexibility and makes it possible to manage larger data blocks.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A MESI protocol state process, comprising:

a modified state;

an exclusive state;

a shared state;

an invalid state; and an intermediate state between the shared state and the modified state, wherein the intermediate state is entered into when a first processor processes a request to write certain data to an address in its cache memory marked as being in the modified state, and wherein if the first processor subsequently receives a request to perform a memory operation on the certain data then the modified state is entered into in the first processor, and the invalid state is entered into for other processors, or wherein if the first processor subsequently receives an indication that the other processor is operating on the certain data then the invalid state is entered into in the first processor.

2. The process of claim 1 wherein, when in the intermediate state between the shared state and the modified state by the first processor, the other processor remains in the shared state with respect to that certain data.

\* \* \* \* \*